United States Patent [19]

Brown

[11] Patent Number: 5,411,297
[45] Date of Patent: May 2, 1995

[54] CONDUIT MOUNTING SYSTEM

[75] Inventor: Lanny D. Brown, Lexington, Mich.

[73] Assignee: Huron, Inc., Lexington, Mich.

[21] Appl. No.: 208,356

[22] Filed: Mar. 9, 1994

[51] Int. Cl.6 ............................................. F16L 27/12
[52] U.S. Cl. ...................... 285/62; 285/351; 285/247; 285/9.2; 285/158; 123/468
[58] Field of Search ................. 285/61, 62, 351, 297, 285/163, 165, 19, 347, 9.2, 158; 248/49, 65, 73; 123/468, 469

[56]         References Cited
       U.S. PATENT DOCUMENTS

|   |   |   |   |
|---|---|---|---|
| 885,662 | 4/1908 | Bowden . | |
| 1,351,338 | 8/1920 | Magee | 285/62 |
| 1,528,476 | 3/1925 | Gibson et al. . | |
| 2,344,698 | 3/1944 | Howe . | |
| 2,452,430 | 10/1948 | Clark et al. . | |
| 2,596,020 | 5/1952 | Fletcher et al. | 285/61 |
| 2,829,909 | 4/1958 | Magnani . | |
| 3,173,710 | 3/1965 | Kinnison | 285/9.2 |
| 3,198,560 | 8/1965 | Collins . | |
| 3,339,949 | 9/1967 | Szohatzky . | |
| 3,468,560 | 9/1969 | Cassel | 285/9.2 |
| 3,589,873 | 6/1971 | Poth . | |
| 4,082,318 | 4/1978 | Mueller, Jr. . | |
| 4,128,264 | 12/1978 | Oldford . | |
| 4,198,077 | 4/1980 | Oldford . | |
| 4,245,858 | 1/1981 | Cox . | |
| 4,353,580 | 10/1982 | Houck . | |
| 4,396,213 | 8/1983 | Hawkins . | |
| 4,519,368 | 5/1985 | Hudson, Jr. | 123/468 |
| 4,669,757 | 6/1987 | Bartholomew | 285/297 |
| 4,798,187 | 1/1989 | Hudson, Jr. | 123/469 |
| 4,836,584 | 6/1989 | Baker | 285/351 |
| 4,863,202 | 9/1989 | Oldford . | |
| 4,913,119 | 4/1990 | Usui | 123/468 |
| 5,022,355 | 6/1991 | Billingsley et al. | 123/469 |
| 5,022,372 | 6/1991 | Imura et al. | 123/469 |
| 5,024,469 | 6/1991 | Aitken et al. | 285/351 |
| 5,176,410 | 1/1993 | Beyer . | |
| 5,197,435 | 3/1993 | Mazur et al. | 123/469 |
| 5,269,650 | 12/1993 | Benson | 285/9.2 |

FOREIGN PATENT DOCUMENTS

| | | | |
|---|---|---|---|
| 556938 | 2/1960 | Belgium | 285/61 |
| 1573118 | 7/1969 | France | 285/61 |
| 2361592 | 4/1978 | France | 285/351 |
| 193386 | 12/1937 | Switzerland | 285/61 |
| 626 | of 1895 | United Kingdom | 285/61 |
| 2107809 | 5/1983 | United Kingdom | 285/351 |

Primary Examiner—Eric K. Nicholson
Attorney, Agent, or Firm—Harness, Dickey & Pierce

[57]           ABSTRACT

A quick connector assembly has a male fitting and a female fitting. The female fitting includes a conduit having a brazed eyelet which couples with a projection member including O rings on the male fitting to seal the male fitting with the female fitting. The female fitting includes a bracket placed at the other end of the conduit to secure the female fitting in place with respect to the male fitting. The fittings are able to enable axial and rotational movement with respect to one another.

14 Claims, 1 Drawing Sheet

CONDUIT MOUNTING SYSTEM

BACKGROUND OF THE INVENTION

The present invention relates to connector assemblies and, more particularly, to a quick connect assembly.

various types of quick connect assemblies exist in the art. Ordinarily, these types of assemblies utilize threaded fittings, snap fittings or the like to connect the male and female fittings with one another. Also, different types of retainers exist which maintain the male and female couplings together. Generally, these types of couplings have the physical connection at the connected ends.

U.S. Pat. Nos. 4,863,202, 4,198,077, 4,128,264, 1,528,476, 2,829,909, 4,082,318, 4,353,580, 4,245,858, 4,396,213, 3,198,560, 3,339,949, 5,176,410, 3,589,873, 2,344,698, 2,452,430, and 885,662 illustrate various types of connector designs. While the designs apparently operate satisfactorily, designers strive to improve the art.

SUMMARY OF THE INVENTION

It is desirous to have a quick connector where the male and female fittings are rapidly connected together without having a bulky retention device at the connection of the two fittings. The present invention provides the art with such a device.

The present invention provides a female fitting which includes a conduit having a smooth eyelet to connect with a male fitting on one of the conduit ends. The invention provides a bracket, remote from the connection at the other end of the conduit, to secure the female fitting with respect to the male fitting. Also, the present invention enables axial movement of the female fitting with respect to the male fitting without losing sealing contact between the male and female fittings. Further, the sealing contact is retained during continual movement of the male and female fittings.

From the following detailed description taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
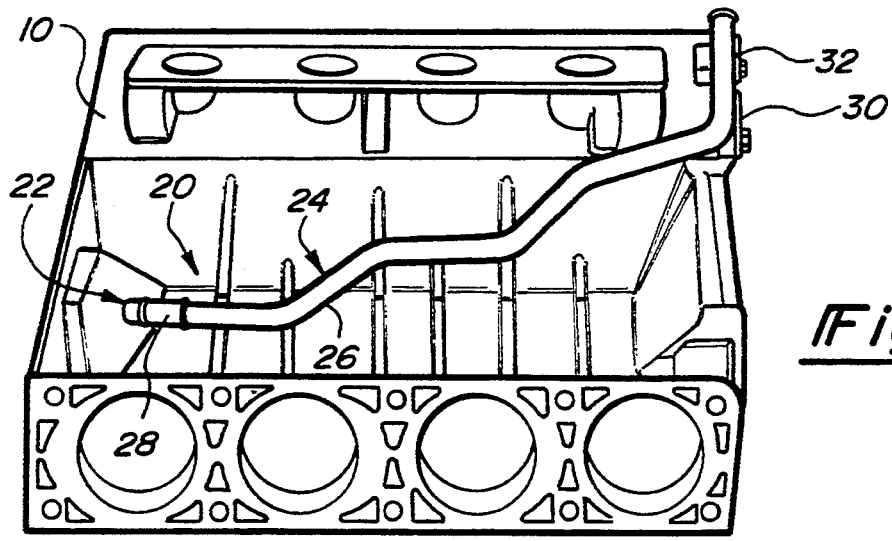
FIG. 1 is a perspective view of a quick connector assembly in accordance with the present invention attached to an engine block

Turning to the figures, particularly FIG. 1, an engine with a quick connector in accordance with the invention is illustrated. The engine block 10 is shown with several components removed. The quick connector 20 is illustrated connected to the engine block 10.

Figure 2:
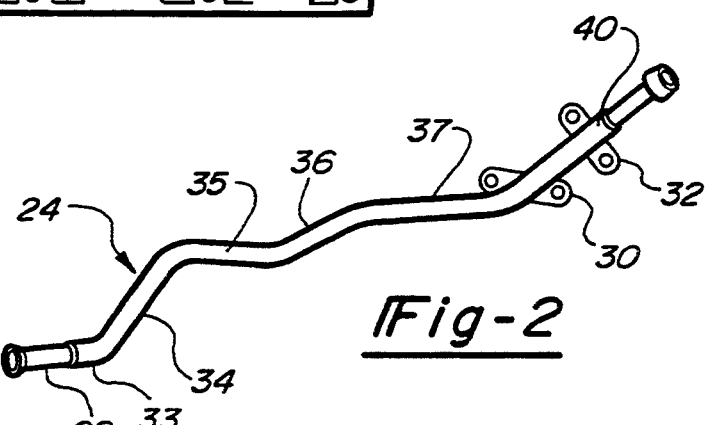
FIG. 2 is a perspective view of the female quick connector portion of the assembly of FIG. 1.

The quick connector 20 includes a male fitting 22 press fit into the engine block 10 and a female fitting 24. The female fitting 24 includes an elongated conduit 26 having an eyelet 28 on one end and a pair of brackets 30 and 32 on the other. The conduit 26, as seen in FIG. 2, includes several segments 33, 34, 35, 36, 37, connected by intervening bends to provide an overall step shape and a leg 40 transverse to the step portions. The leg 40 includes the brackets 30 and 32. The brackets 30 and 32 are brazed onto the conduit. The brackets 30, 32 have mounting holes to enable bolts to pass through the holes and secure the conduit to the engine block 10.

Figure 3:
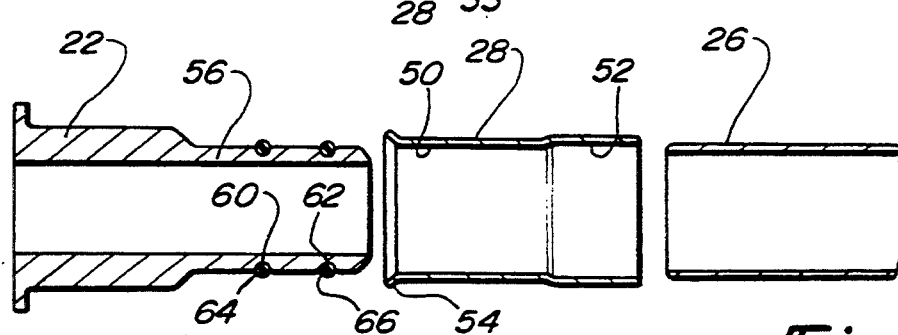
FIG. 3 is a partial cross sectional view of the female and male connector portions in a disassembled condition.

The eyelet 28 has a cylindrical shape with a smooth interior circumference as illustrated in FIG. 3. Also, the eyelet 28 includes two inner diameter portions 50 and 52. The inner diameter portion 50 is to be coupled with the male fitting 24 while the inner diameter 52 is to receive the end of the conduit 26. The eyelet 28 is slid onto the conduit 26 and is brazed to the conduit end. Also, the eyelet 28 has a flange 54 which is flared out so as to prevent damage to the O rings when being assembled into place.

Figure 4:
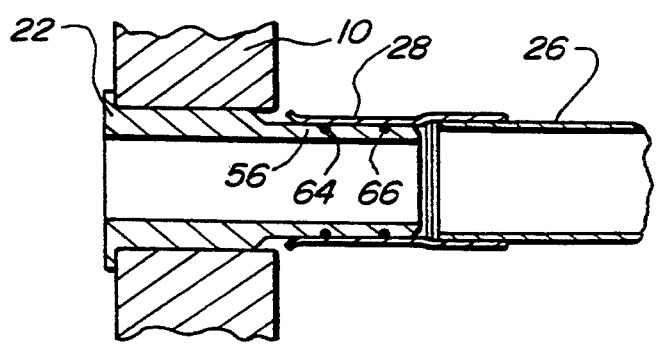
FIG. 4 is a cross sectional view of the male and female fitting of the quick connector assembly of FIG. 1 along line 4-4 thereof.

The male fitting 22 is press fit into the engine block 10, as illustrated in FIGS. 1 and 4, and has a projecting member 56. The projection member 56 is cylindrical, having a pair of grooves 60 and 62 in the projecting member. The grooves 60 and 62 receive elastomeric O rings 64, 66 which seal the eyelet 28 with the male projection member 56. The eyelet 28 is slid over the O rings to seal the female fitting with the male fitting. While the eyelet 28 is on the male fitting, a seal is maintained while the conduit and eyelet are able to move axially and rotationally with respect to the male fitting 22. Thus, by positioning the brackets at the other end of the conduit, the eyelet connection enables axial and rotational movement of the fittings without losing the seal between them.

While the above detailed description describes the preferred embodiment of the present invention, the invention is susceptible to modification, variation, and alteration without deviating from the scope and fair meaning of the subjoined claims.

I claim:

1. A quick connector assembly comprising:
  a male fitting having a projecting member and a securing portion to secure the male fitting to an engine or the like, said projecting member having a pair of spaced circumferential grooves;
  a pair of O rings positioned in said grooves;
  a female fitting, said female fitting including a conduit having two ends, an eyelet is affixed to one end of said conduit for coupling with the male fitting projecting member, and a bracket means coupled with the other end of the conduit to secure the female fitting on the engine said eyelet has a smooth interior surface for establishing a seal with said O rings and enabling axial movement of said female fitting on said male fitting projecting member while maintaining sealing with said O rings.

2. The quick connector according to claim 1 wherein said eyelet is brazed on said conduit.

3. The quick connector according to claim 1 wherein said bracket means includes a pair of brackets brazed on said conduit.

4. The quick connector according to claim 1 wherein said eyelet includes two inner diameters, one for coupling with said male projecting member and the other to receive the conduit end.

5. The quick connector according to claim 1 wherein said conduit has an overall L shape with a plurality of segments and bends on one of its legs.

6. The quick connector according to claim 5 wherein said bracket means are coupled with one of its legs of said conduit.

7. The quick connector according to claim 5 wherein said segments and bends are in a step configuration.

8. A quick connector assembly in an engine comprising:
an engine block, said engine block including a male fitting press fit therein, said male fitting having a projecting member with a pair of spaced circumferential grooves;
a pair of O rings positioned in said grooves;
a female fitting, said female fitting including a conduit having two ends, an eyelet is affixed to one end of said conduit for coupling with the male fitting projecting member, and a bracket means coupled with the other end of the conduit to secure the female fitting on the engine said eyelet has a smooth interior surface sealing with said O rings while enabling axial movement of said female fitting on said male fitting projecting member and maintaining the seal.

9. The quick connector according to claim 8 wherein said eyelet is brazed on said conduit.

10. The quick connector according to claim 8 wherein said bracket means includes a pair of brackets brazed on said conduit.

11. The quick connector according to claim 8 wherein said eyelet includes two inner diameter portions, one for coupling with said male projecting member and the other to receive the conduit end.

12. The quick connector according to claim 8 wherein said conduit has an overall L shape with a plurality of segments and bends on one of its legs.

13. The quick connector according to claim 13 wherein said bracket means are coupled with one of its legs of said conduit.

14. The quick connector according to claim 12 wherein said segments and bends are in a step configuration.

* * * * *

UNITED STATES PATENT AND TRADEMARK OFFICE
CERTIFICATE OF CORRECTION

PATENT NO. : 5,411,297
DATED : May 02, 1995
INVENTOR(S) : Lanny D. Brown

It is certified that error appears in the above-indentified patent and that said Letters Patent is hereby corrected as shown below:

Col. 1, Line 7, "various" should be --Various--

Col. 4, Line 16, Claim 13, "Claim 13" should be --Claim 12--.

Signed and Sealed this

Eighteenth Day of July, 1995

Attest:

BRUCE LEHMAN

*Attesting Officer*          *Commissioner of Patents and Trademarks*